United States Patent
Ganev

(10) Patent No.: US 7,148,649 B2
(45) Date of Patent: *Dec. 12, 2006

(54) HYBRID-ELECTRIC VEHICLE HAVING A MATCHED REACTANCE MACHINE

(75) Inventor: Evgeni Ganev, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 131 days.

This patent is subject to a terminal disclaimer.

(21) Appl. No.: 10/950,107

(22) Filed: Sep. 24, 2004

(65) Prior Publication Data

US 2005/0179264 A1    Aug. 18, 2005

Related U.S. Application Data

(63) Continuation-in-part of application No. 10/779,720, filed on Feb. 18, 2004, now Pat. No. 7,002,317.

(51) Int. Cl.
*H02P 8/00* (2006.01)

(52) U.S. Cl. .................. 318/701; 318/727; 318/801; 322/90; 322/94; 363/127

(58) Field of Classification Search ............ 318/432, 318/439, 139, 701, 801, 727; 322/46, 90, 322/94; 323/210; 363/127
See application file for complete search history.

(56) References Cited

U.S. PATENT DOCUMENTS

| | | | |
|---|---|---|---|
| 3,628,621 A | 12/1971 | Lee | |
| 3,650,345 A | 3/1972 | Yardney | |
| 3,792,327 A | 2/1974 | Waldorf | |
| 3,796,278 A | 3/1974 | Shibata | |
| 3,837,419 A | 9/1974 | Nakamura | |
| 3,842,287 A | 10/1974 | Nakamura | |
| 3,936,727 A * | 2/1976 | Kelley et al. | 323/210 |
| 3,963,978 A * | 6/1976 | Kelley et al. | 323/210 |
| 4,099,589 A | 7/1978 | Williams | |
| 4,119,862 A | 10/1978 | Gocho | |
| 4,187,436 A | 2/1980 | Etienne | |
| 4,292,531 A * | 9/1981 | Williamson | 290/14 |
| 4,313,080 A | 1/1982 | Park | |
| 4,444,285 A | 4/1984 | Stewart et al. | |
| 4,547,678 A | 10/1985 | Metzner et al. | |
| 4,951,769 A | 8/1990 | Kawamura | |
| 5,172,784 A | 12/1992 | Varela, Jr. | |
| 5,214,358 A | 5/1993 | Marshall | |
| 5,373,219 A | 12/1994 | Grabowski et al. | |
| 5,406,126 A | 4/1995 | Hadley et al. | |
| 5,432,413 A | 7/1995 | Duke et al. | |
| 5,545,928 A | 8/1996 | Kotani | |
| 5,568,023 A | 10/1996 | Grayer et al. | |
| 5,588,498 A | 12/1996 | Kitada | |
| 5,635,805 A | 6/1997 | Ibaraki et al. | |
| 5,650,713 A | 7/1997 | Takeuchi et al. | |
| 5,650,931 A | 7/1997 | Nii | |

(Continued)

*Primary Examiner*—Paul Ip
(74) *Attorney, Agent, or Firm*—Oral Caglar, Esq.

(57) ABSTRACT

A hybrid-electric vehicle including a matched reactance machine power generation system (MRMPGS). The MRMPGS comprises a permanent magnet rotor type machine having a selected back electromotive force (BEMF) voltage value and a selected machine inductance value. The BEMF voltage value is selected having a line-to-line peak voltage that is equal to a desired terminal voltage of the machine at a first machine speed. The machine inductance value is selected based upon a machine reactance value and a frequency value, which correspond to a proportional increase in the selected BEMF voltage value between the first machine speed and a second machine speed.

17 Claims, 8 Drawing Sheets

U.S. PATENT DOCUMENTS

| | | | |
|---|---|---|---|
| 5,751,138 A * | 5/1998 | Venkata et al. ............. 323/207 |
| 5,785,136 A | 7/1998 | Falkenmayer et al. |
| 5,804,947 A | 9/1998 | Nii et al. |
| 5,848,659 A | 12/1998 | Karg et al. |
| 5,998,960 A | 12/1999 | Yamada et al. |
| 6,051,951 A | 4/2000 | Arai et al. |
| 6,059,059 A | 5/2000 | Schmidt-Brücken |
| 6,066,928 A | 5/2000 | Kinoshita et al. |
| 6,066,934 A * | 5/2000 | Kaitani et al. ............. 318/490 |
| 6,098,735 A | 8/2000 | Sadarangani et al. |
| 6,102,144 A | 8/2000 | Lutz |
| 6,114,775 A | 9/2000 | Chung et al. |
| 6,132,902 A | 10/2000 | Miyasaka |
| 6,202,776 B1 | 3/2001 | Masberg et al. |
| 6,209,672 B1 | 4/2001 | Severinsky |
| 6,362,586 B1 * | 3/2002 | Naidu ........................ 318/432 |
| 6,370,050 B1 | 4/2002 | Peng et al. |
| 6,476,571 B1 * | 11/2002 | Sasaki ........................ 318/139 |
| 6,492,785 B1 | 12/2002 | Kasten et al. |
| 6,530,426 B1 | 3/2003 | Kishita et al. |
| 6,554,088 B1 | 4/2003 | Severinsky et al. |
| 6,583,995 B1 * | 6/2003 | Kalman et al. ............... 363/35 |
| 6,603,227 B1 | 8/2003 | Rose, Sr. |
| 6,605,912 B1 * | 8/2003 | Bharadwaj et al. ......... 318/439 |
| 6,683,389 B1 | 1/2004 | Geis |
| 6,708,789 B1 | 3/2004 | Albuquerque De Souza E. Silva |
| 6,724,100 B1 | 4/2004 | Gabriel |
| 2002/0171387 A1 * | 11/2002 | Stancu et al. ............... 318/727 |
| 2003/0007371 A1 * | 1/2003 | Kawazoe et al. ............. 363/37 |
| 2003/0102738 A1 * | 6/2003 | Kusase .................... 310/75 R |
| 2003/0193310 A1 * | 10/2003 | Raftari et al. ............... 318/798 |
| 2004/0020697 A1 | 2/2004 | Field |
| 2004/0145356 A1 * | 7/2004 | Kalman et al. ............... 322/46 |

* cited by examiner

HYBRID-ELECTRIC VEHICLE HAVING A MATCHED REACTANCE MACHINE

CROSS-REFERENCES TO RELATED APPLICATIONS

This application is a continuation-in-part of application Ser. No. 10/779,720, filed Feb. 18, 2004 now U.S. Pat. No. 7,002,317, and titled "Matched Reactance Machine Power-Generation System" herein incorporated by reference in its entirety.

FIELD OF THE INVENTION

The present invention relates generally to hybrid-electric vehicles.

BACKGROUND

Over the past years, much work has been done to try and make hybrid-electric vehicles (HEVs) a viable alternative to non-hybrid vehicles. Hybrid-electric vehicles are often classified as being "series hybrid" or "parallel hybrid". In a series hybrid HEV, an engine turns a generator, and the generator is used to power one or more electric motors with rotation of the motor shaft(s) being used to move the vehicle. In many instances, the generator is also used to charge on-board batteries, which are used to supplement power provided by the generator during heavy load conditions, and to store energy recovered via regenerative braking.

In some instances, a turbine engine is used to turn the generator, which may be a permanent magnet generator, as described in U.S. Pat. No. 6,683,389, and U.S. Pat. No. 5,568,023. Unfortunately, previous apparatus and methods used in series hybrid HEVs tend to have substantial hardware and production costs, have less than optimum reliability, and have excessive volume and weight. As such, there is a need for improved HEVs.

SUMMARY OF THE INVENTION

An embodiment of the present invention is directed to a hybrid-electric vehicle including a matched reactance machine power generation system (MRMPGS). The MRMPGS includes a permanent magnet rotor type machine having a selected back electromotive force (BEMF) voltage value and a selected machine inductance value. The BEMF voltage value is selected to have a line-to-line peak voltage that is equal to a desired terminal voltage of the machine at a first machine speed. The machine inductance value is selected based upon a machine reactance value and a frequency value, which correspond to a proportional increase in the selected BEMF value between the first machine speed and a second machine speed.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
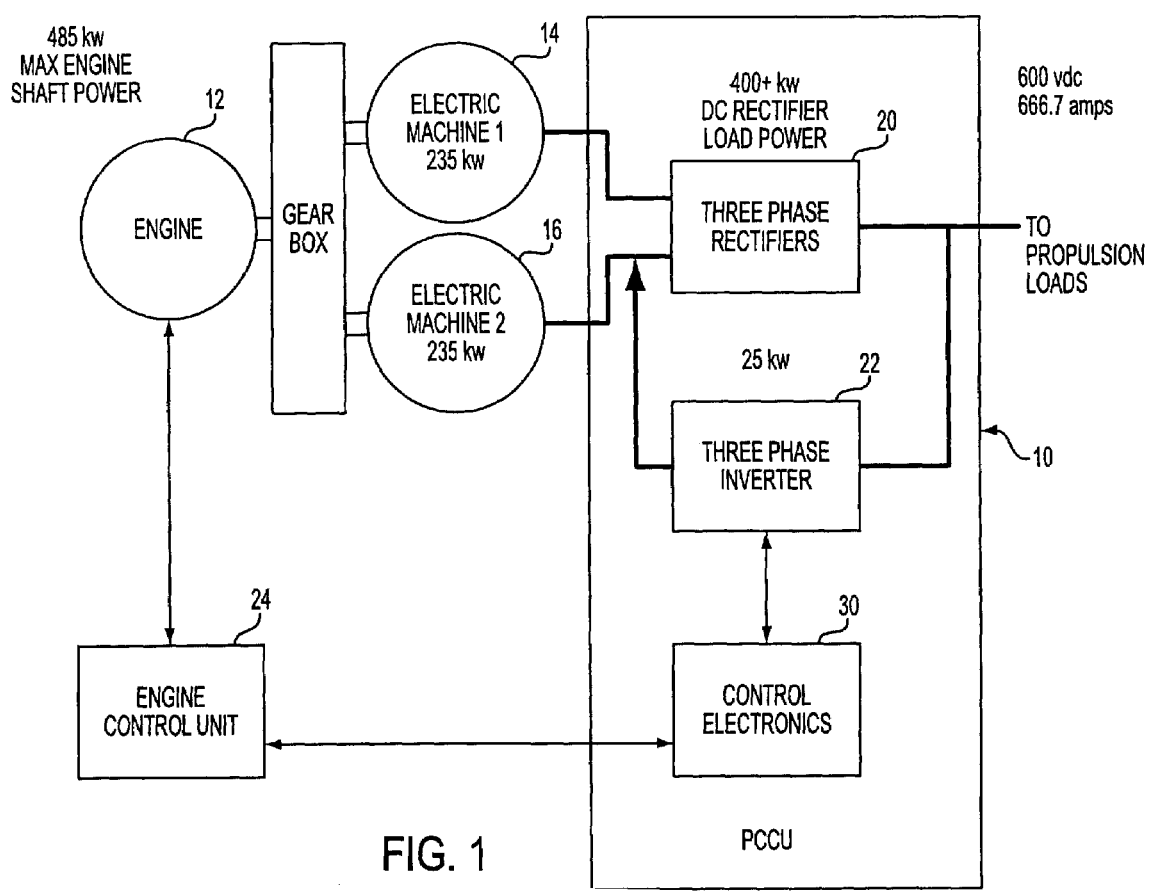
FIG. 1 is a block diagram illustrating an example of a system architecture for a power generation system in accordance with an embodiment of the invention.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the invention. However, it will be understood by one of ordinary skill in the art that the invention may be practiced without these specific details. In other instances, well known methods, procedures, components, and circuits have not been described in detail so as not to unnecessarily obscure the important aspects of the invention.

The embodiment of the invention described below provides a novel electric hybrid vehicle architecture using a matched reactance machine power generation system (MRMPGS). The description starts with a system and method for using a synchronous permanent magnet (PM) rotor machine for power generation without requiring an active power electronics conditioner, and then continues with a preferred HEV architecture that utilizes such system for power generation.

MRMPGS

Using a novel MRMPGS provides a constant-voltage DC power for an HEV electric power distribution system, and with the introduction of the MRMPGS, the capability of the PM machine can be extended to cover the variable-speed constant-voltage DC power-generation system with a simple bridge rectifier. As used herein, a simple bridge rectifier includes diodes.

To satisfy the requirements of a matched reactance machine system in accordance with an embodiment of the invention, a PM machine with a specially selected BEMF voltage and machine inductance is needed. As known to those skilled in the art, the magnetic flux in a PM machine is provided by permanent magnets embedded in the rotor assembly. The value of the BEMF is dependent upon the flux produced by the field and the armature speed.

In the matched reactance machine system of the embodiment described below, at a low or minimum speed the terminal voltage of the machine is selected to be equal to the BEMF, with each having the same amplitude and a phase difference of zero. The output DC voltage is therefore equal to the line-to-line peak voltage of the BEMF. The BEMF constant for the PM machine can be calculated based on this detail.

At a high or maximum speed, the BEMF is increased proportionally with the speed and the internal machine reactance compensates for this increase. The terminal voltage and the phase current are in phase, therefore, the terminal voltage vector and the internal machine voltage drop are perpendicular. Solving the vector diagram defines the machine reactance for the PM machine. The PM machine inductance L is calculated from the machine reactance and the corresponding frequency. The result is a constant output voltage when the prime mover speed is coordinated with the current demand of the system. The following example is presented to illustrate the calculations and implementation of the embodiment of the invention described above.

FIG. 1 shows a block diagram of a power-generation system, which uses a hybrid electric architecture. In diagram 10, an engine 12 is shown integrated with two electric machines 14 and 16, such as a PM synchronous machine, via a gear box 18. Each machine 14 and 16 is electrically coupled with a propulsion load (not shown) via a three phase rectifier 20. A three phase inverter 22 is coupled in parallel with the three phase rectifier 20, and is further electrically coupled with a set of control electronics 30. The control electronics 30 are in communication with the engine control unit 24 and the three-phase inverter 22.

The engine 12 drives the two electric machines, and the AC power generated by the machines is converted to DC power using the simple bridge rectifier 20 for reduced cost, volume and weight. Provisions for self-start of the system are also provided.

In the system of FIG. 1, the engine control unit 24 operates the engine 12 for optimized fuel efficiency. In the example shown, the speed at zero delivered power is approximately 32.0 krpm, and the speed at maximum delivered power is approximately 48.8 krpm. These values are presented as examples, and still other values can exist where parameters are changed for the specific application.

Figure 2:
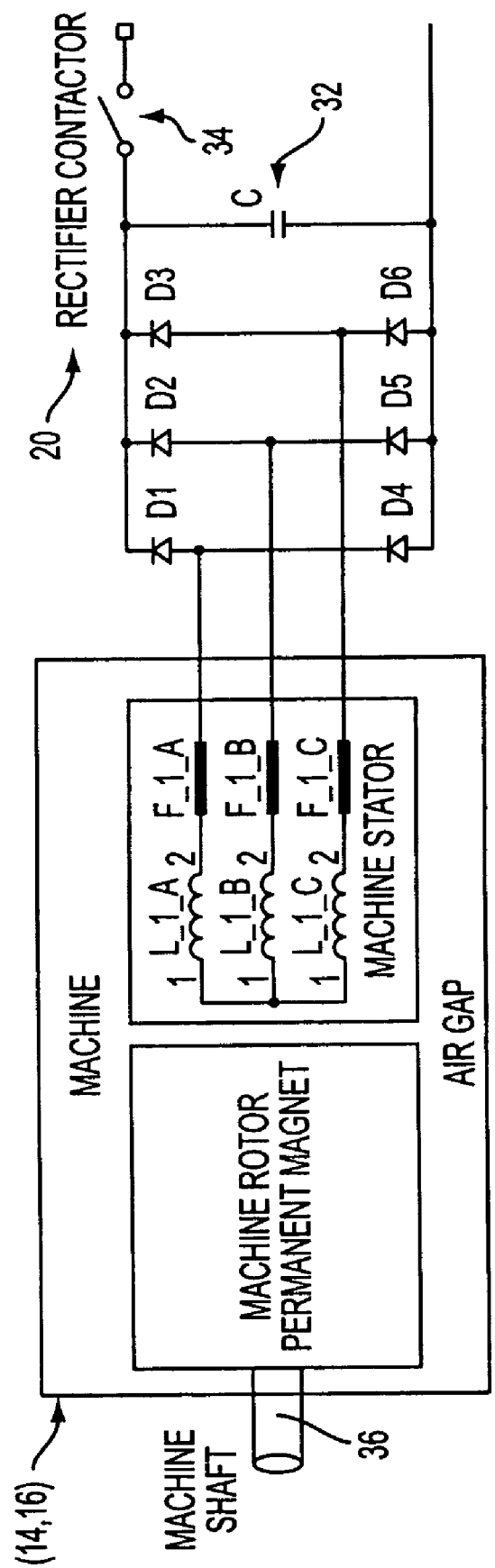
FIG. 2 is a block diagram illustrating an example power topology of MRMPGS in accordance with an embodiment of the invention.

FIG. 2 illustrates a portion of the generation system of FIG. 1, including one PM synchronous generator 14 or 16, and rectifier 20. In FIG. 2, additional elements of the rectifier 20 are shown, including a filtering capacitor 32 and a rectifier contactor 34. The machine shaft 36 of the PM synchronous generator is coupled with the engine shaft (not shown) of engine 12 and operates with variable speeds from approximately 32.0 krpm at zero load to approximately 48.8 krpm at 200 kW load. During the entire speed range, the output voltage of the rectifier, or terminal voltage, is approximately 300 Vdc. The current at low speed (i.e. 32 krpm) is approximately zero, and the current at maximum speed (i.e. 48.8 krpm) is approximately 666.666 A. The engine speed as directed by the engine control unit 24 follows machine power and current demands in order to optimize the fuel efficiency.

Figures 3, 4:
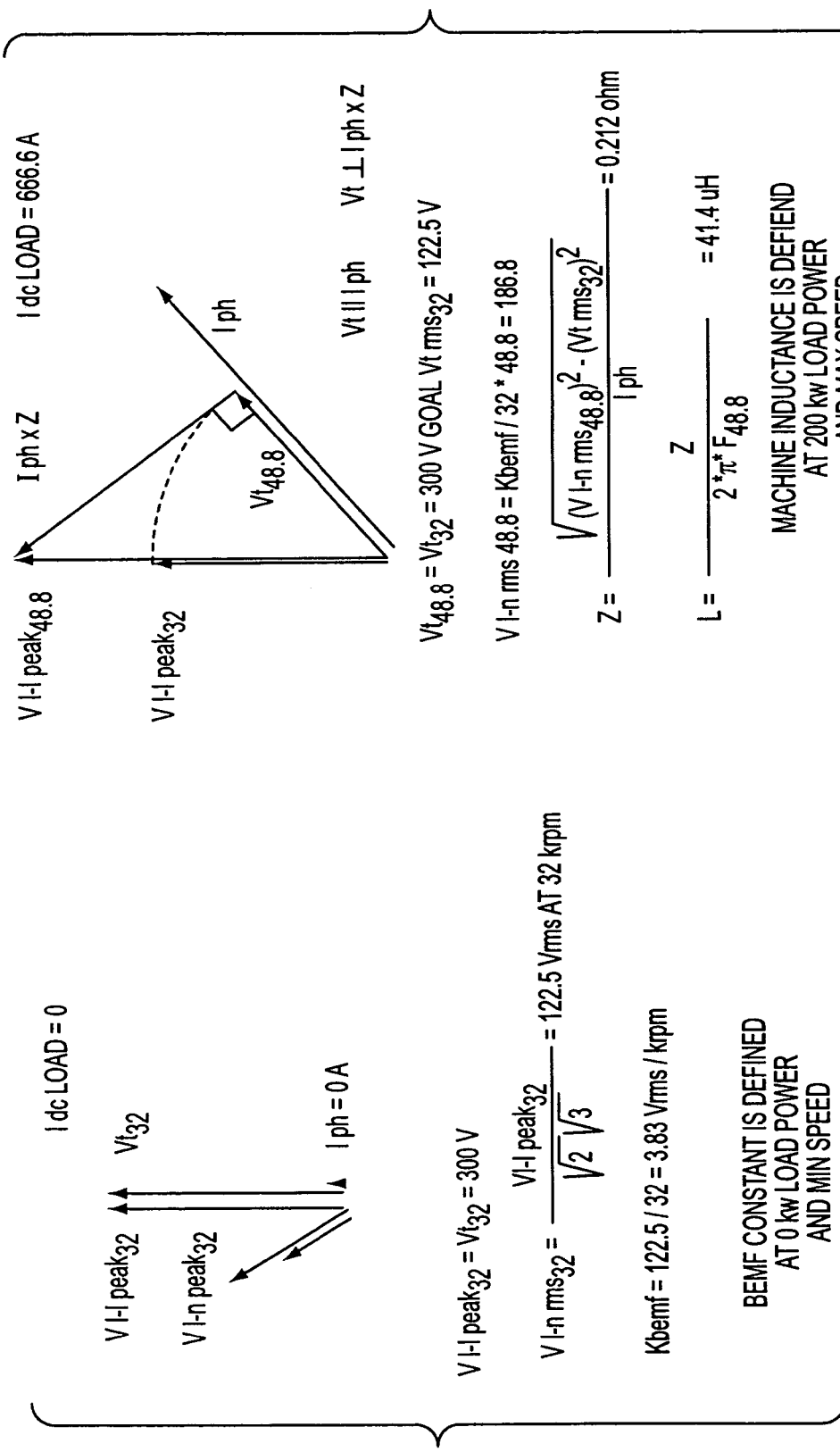
FIG. 3 is a vector diagram illustrating an example of a BEMF constant calculation at 0 kW load power and minimum speed in accordance with an embodiment of the invention.
FIG. 4 is a vector diagram illustrating an example of a machine inductance calculation at 200 kW load power and maximum speed in accordance with an embodiment of the invention.

To satisfy the above requirements, the PM machines 14 and 16 are provided to have specially selected BEMF and machine inductance characteristics. FIGS. 3 and 4 illustrate example calculations used to select such a PM machine for use in accordance with an embodiment of the invention described above. FIG. 3 shows a vector diagram for system operation at low speed (i.e. 32 krpm) where the current delivered to the distribution system is zero or close to zero. At this speed, the terminal voltage of the machine is equal to the BEMF and each has the same amplitude and the phase difference is zero. Therefore the output DC voltage (i.e. 300 V) is equal to the line-to-line peak voltage of the BEMF.

As noted above, the value of the BEMF is dependent upon the flux produced by the field and the armature speed of the machine. The flux is provided by the permanent magnets and as the armature rotates the BEMF is induced in the stator winding. The BEMF constant needed for the PM machine is calculated based on this detail and is shown below in Equations (1) through (3).

In Equation (1), at 32 krpm the terminal voltage Vt of the machine is equal to the line-to-line peak voltage V(line–line)peak of the BEMF and the output DC voltage (i.e. 300 V).

$$V(\text{line–line})\text{peak}_{32} = Vt_{32} = 300V \quad (1)$$

This result can be used in Equations (2) and (3) below to determine a desired value for Kbemf of the PM machine, as the BEMF is dependent upon the flux produced by the field and the armature speed of the machine.

$$V(\text{line–neutral})\,rms_{32} = \frac{V(\text{line–line})peak_{32}}{\sqrt{2}\sqrt{3}} = 122.5 \text{ Vrms} \quad (2)$$

$$Kbemf = \frac{122.5}{32} = \frac{3.83 \text{ Vrms}}{\text{krpm}} \quad (3)$$

FIG. 4 shows a vector diagram of system operation at high speed (i.e. 48.8) krpm where 200 kW (i.e. 666.6 A) is delivered to a distribution bus (not shown) with a goal to maintain the same DC voltage of 300V as shown in FIG. 3. In FIG. 4, the BEMF is increased proportionally with the speed, as the BEMF is dependent upon the armature speed of the machine. Additionally, the terminal voltage and the phase current are in phase. Therefore, the terminal voltage vector and the internal machine voltage drop are perpendicular, and solving the vector diagram for Z yields the machine reactance. The machine inductance L can then be calculated from the calculated Z reactance and the corresponding frequency as shown in Equations (4) through (7) below.

In Equations (4A) and (4B), a goal to maintain the same DC voltage of 300V is shown as in FIG. 3.

$$Vt_{48.8} = Vt_{32} = 300V \text{Goal} \quad (4A)$$

or, $$Vtrms_{32} = 122.5 V \quad (4B)$$

$$V(\text{line} - \text{neutral})rms_{48.8} = \frac{Kbemf}{32 \times 48.8} = 186.8 \text{ V} \quad (5)$$

Where the terminal voltage and the phase current are in phase, the resistive component of the machine reactance is zero. Therefore, the terminal voltage vector and the internal machine voltage drop are perpendicular, and solving the vector diagram for Z in Equation (6) yields the machine reactance.

$$Z = \frac{\sqrt{(V(\text{line} - \text{neutral})rms_{48.8})^2 - (Vtrms_{32})^2}}{Iph} = 0.212 \text{ ohms} \quad (6)$$

The desired machine inductance L can then be calculated from the calculated Z reactance and the corresponding frequency as shown in Equation (7).

$$L = \frac{Z}{2 \times \pi \times F_{48.8}} = 41.4 \text{ uH} \quad (7)$$

Figure 5:
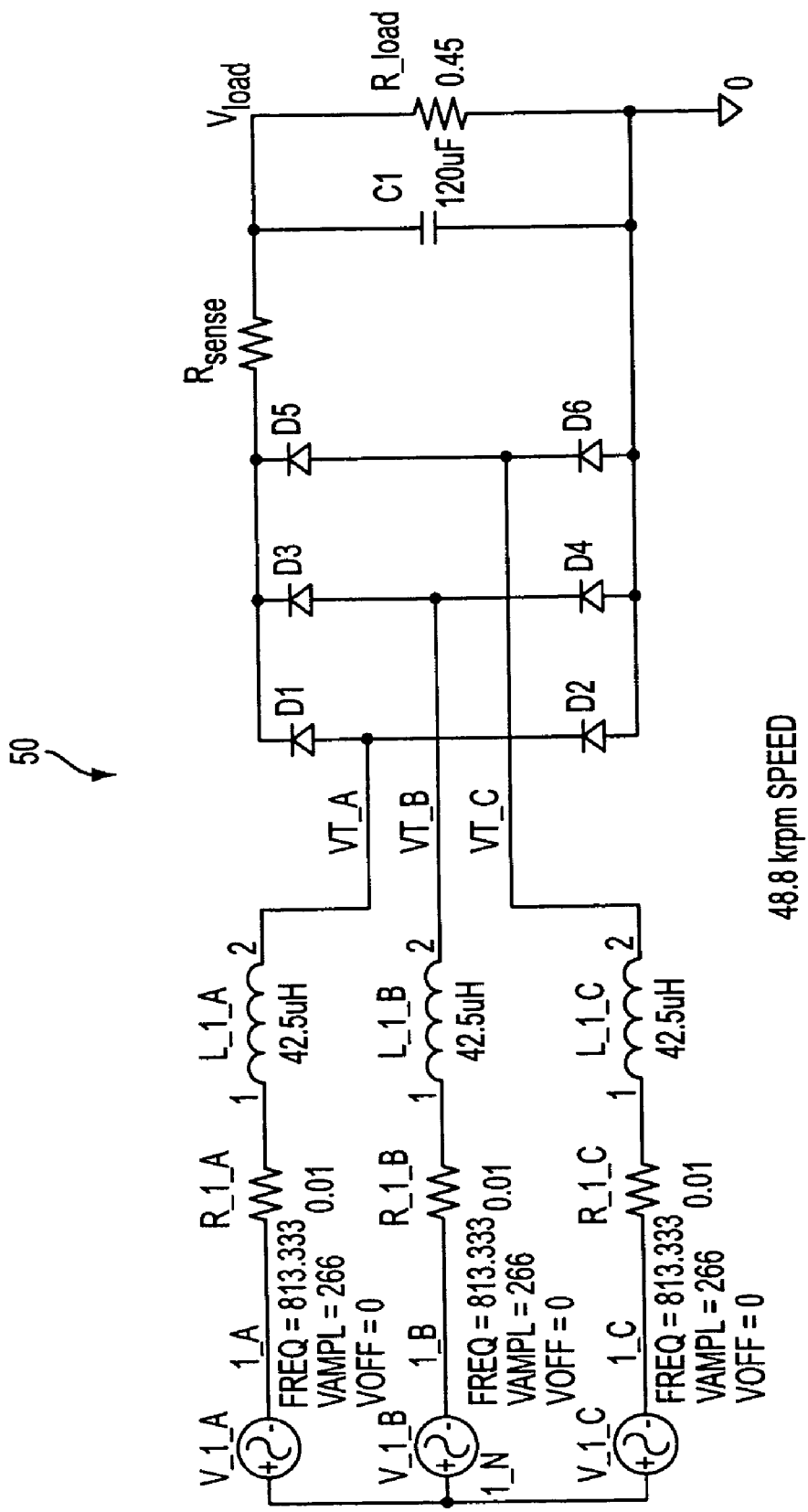
FIG. 5 is a simplified PSpice simulation model in accordance with an embodiment of the invention.

An example of the performance of the embodiment described above is shown in resulting FIGS. 5, 6A, 6B and 7. A simulation using the PSpice™ simulation software can be used to verify the concept for the MRMPGS described above. The PSpice model 50 of an embodiment of the invention shown in FIG. 5 provides parallel calculations and accounts for machine electrical parameters and realistic diode parameters for a circuit representation of a system as calculated above and shown in FIG. 2. Once determined, a steady-state simulation can be produced and the results evaluated.

Figure 6A:
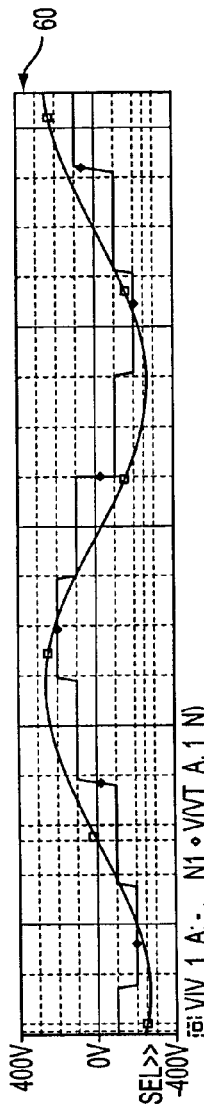
FIG. 6A is a PSpice simulation result for BEMF voltage and machine terminal voltage at 48.8 krpm speed in accordance with an embodiment of the invention.
Figure 6B:
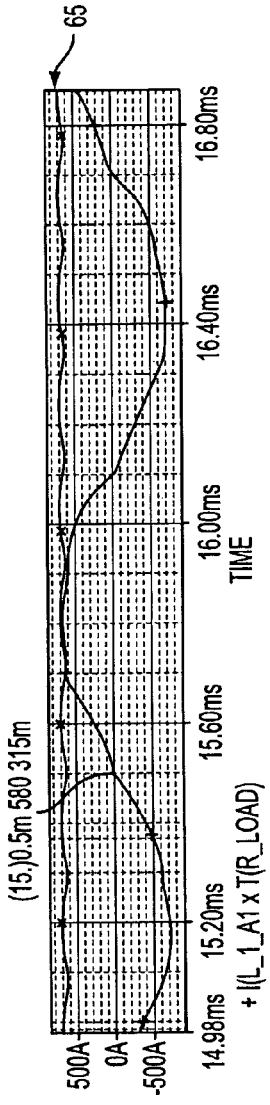
FIG. 6B is a PSpice simulation result for the electric machine phase current and DC load current at 48.8 krpm speed in accordance with an embodiment of the invention.
Figure 7:
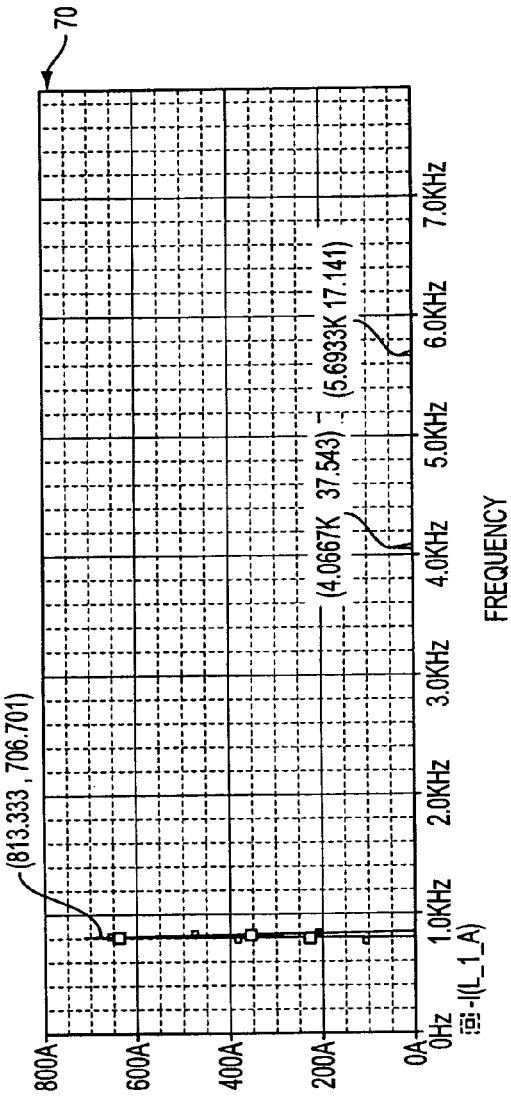
FIG. 7 is a PSpice simulated machine phase current spectrum plot in accordance with an embodiment of the invention.

FIGS. 6A and 6B show the steady-state simulation results for the 48.8 krpm speed and maximum power in plots 60 and 65, and Table 1, described in greater detail below, summarizes the simulation results for five operating points. FIG. 7 shows the spectrum of the machine phase current at maximum power in plot 70.

Additional values for the embodiment described above includes a value for BEMF within a range from 122.5 Vrms to 186.8 Vrms line to neutral (l-n), which does not present stress on the insulation system of the machine. The terminal voltage of the machine does not exceed 122.5 Vrms l-n, and the inductance of the machine is within a range of 42 uH, which does not present any difficulties for a such size machine.

FIG. 6A is a PSpice simulation result for the BEMF voltage and the machine terminal voltage at 48.8 krpm in accordance with an embodiment of the invention. FIG. 6B is a PSpice simulation result of the electric machine phase current and the DC load current at 48.8 krpm in accordance with an embodiment of the invention. As noted in FIGS. 6A and 6B, the machine current wave shape is close to sinusoidal and includes only minimal harmonics of any significance, specifically, $5^{th}$ and $7^{th}$ harmonics. With a relatively low value for the DC link capacitor 32 (i.e. 120 μF), the $5^{th}$ harmonic is about 5%, and the $7^{th}$ harmonic is about 2% of the fundamental current value, therefore total harmonic distortion (THD) of the current remains quite low. Also, where these values exist, machine steel loss is low when compared to a machine with more conventional (i.e. lower) reactance.

Table 1 below is an example simulation result summary. Using the results provided by Equations (1) through (7), the MRMPGS provides a substantially constant DC Bus Load Voltage for an electric power distribution system within a DC Bus Load Power range and a speed range.

TABLE 1

| | | Two-Pole PM machine requirements | | | | |
|---|---|---|---|---|---|---|
| DC Bus Load | % | 0 | 25 | 50 | 75 | 100 |
| DC Bus Load Power | kW | 0 | 50 | 100 | 150 | 200 |
| DC Bus Load Voltage | Vdc | 300 | 297 | 302 | 300 | 300 |
| DC Bus Load Current | Amps | 0.3 | 168.4 | 331.1 | 500.0 | 666.7 |
| Engine Speed | krpm | 32.0 | 36.2 | 40.4 | 44.6 | 48.8 |
| Machine Frequency | Hz | 533.3 | 603.3 | 673.3 | 743.3 | 813.3 |
| Emf PH to N rms | V | 122.6 | 138.6 | 154.7 | 170.8 | 186.9 |
| DC Load Resistance | Ohm | ∞ | 1.764 | 0.912 | 0.600 | 0.450 |
| Max Speed | krpm | 48.8 | | | | |
| Min Speed | krpm | 32.0 | | | | |
| Back emf Constant | V/krpm | 3.83 | | | | |
| Inductance PH to N | uH | 42.5 | | | | |
| DC bus Filter capacitor | uF | 120 | | | | |

The matched reactance machine short circuit current is independent of the machine speed and is approximately twice the rated current, which is convenient for implementing short circuit protection. The Table 1 shows that the DC supply voltage remains constant and the machine power factor is close to unity for the entire speed and power range, therefore losses are minimized for both the PM machines 14 and 16, and the semiconductor rectifier 20.

The matched reactance machine power-generation system of the embodiment described above therefore provides a constant-voltage output for the entire electric load range with a variable speed engine operation. The capability of the PM machine is extended to cover the variable-speed, constant-voltage DC power-generation system with the addition of a simple bridge rectifier. At the same time, a simple conventional diode rectifier can be used and the system can allow for a gearless-oilless integration.

The MRMPGS of the embodiment described above provides an optimized solution for several applications. For example, where a twin-pack concept is implemented, that is, a system having two separate 200 kW turbogenerators, one recuperated and one not recuperated, the above embodiment can be implemented as a gearless-oilless, direct-drive Permanent Magnet Starter/Generator (PMS/G) at 50,000 rpm. This results in a much smaller package and a simpler engine having no lube system or gearbox. The MRMPGS approach offers an optimized solution for this integration.

The MRMPGS is also applicable to power generation systems where the prime mover needs variable speed operation for fuel efficiency and a constant output DC voltage. With the embodiment of the invention described above, the capability of the PM machine is extended to cover the variable-speed constant-voltage DC power-generation system with a simple bridge rectifier.

Unlike prior art applications which implement voltage regulation by controlling the current in the field winding, the machine in the embodiment of the invention described above is a permanent magnet rotor type without field winding for excitation. This type of machine presents much better reliability as the excitation of the machine is fixed and achieved by a permanent magnet embedded in the rotor assembly. The voltage regulation in such a system is achieved as a speed and load coordination based on a specially selected and calculated machine reactance to achieve compensation between the external voltage variation with the internal machine voltage drop.

Also, the machine in the embodiment of the invention described above can be of any permanent magnet rotor machine type, and is not required to operate in the saturation region. Therefore, the air gap can be optimized without any restrictions imposed by the regulation coil, and design optimization is achieved through material utilization. Furthermore, the machine can be of both axial and radial air gap type and additional windings are not required for achieving voltage regulation. Machines without additional windings and circuits, such as multiple rotors or multiple stators, present much better reliability as the existence of additional windings and circuits increases machine losses and reduces the overall system efficiency.

MRM HEV Architecture

The MRMPGS described above can be used to provide constant-voltage DC power for an HEV electric power distribution system. The constant voltage is achieved at variable prime mover speeds for optimal fuel consumption implementation. This approach uses a synchronous permanent-magnet rotor machine without an active power electronics conditioner. This approach also uses an energy storage unit such as a battery connected directly to the DC distribution bus of the HEV, eliminating the need for a battery power-conditioning unit. The architecture satisfies all requirements for an electric hybrid vehicle including dynamic braking and storing regenerated power in a vehicle battery. At the same time, the electric power conversion components are minimized. Therefore, minimum weight volume and cost are achieved.

The use of the architecture described herein to include a matched reactance machine (MRM) in an HEV provides a number of benefits including, but not necessarily limited to: (a) simplifying power generation hardware; (b) providing battery recharge operations without costly DC/DC power conversion hardware; (c) providing continuous vehicle dynamic braking and power dissipation of the excessive power; (d) providing acceptable DC voltage variation at any operating conditions including variable prime mover speed and vehicle dynamic braking mode; (e) reducing filtering hardware; and (f) reducing overall cost and improving affordability.

Figure 8:
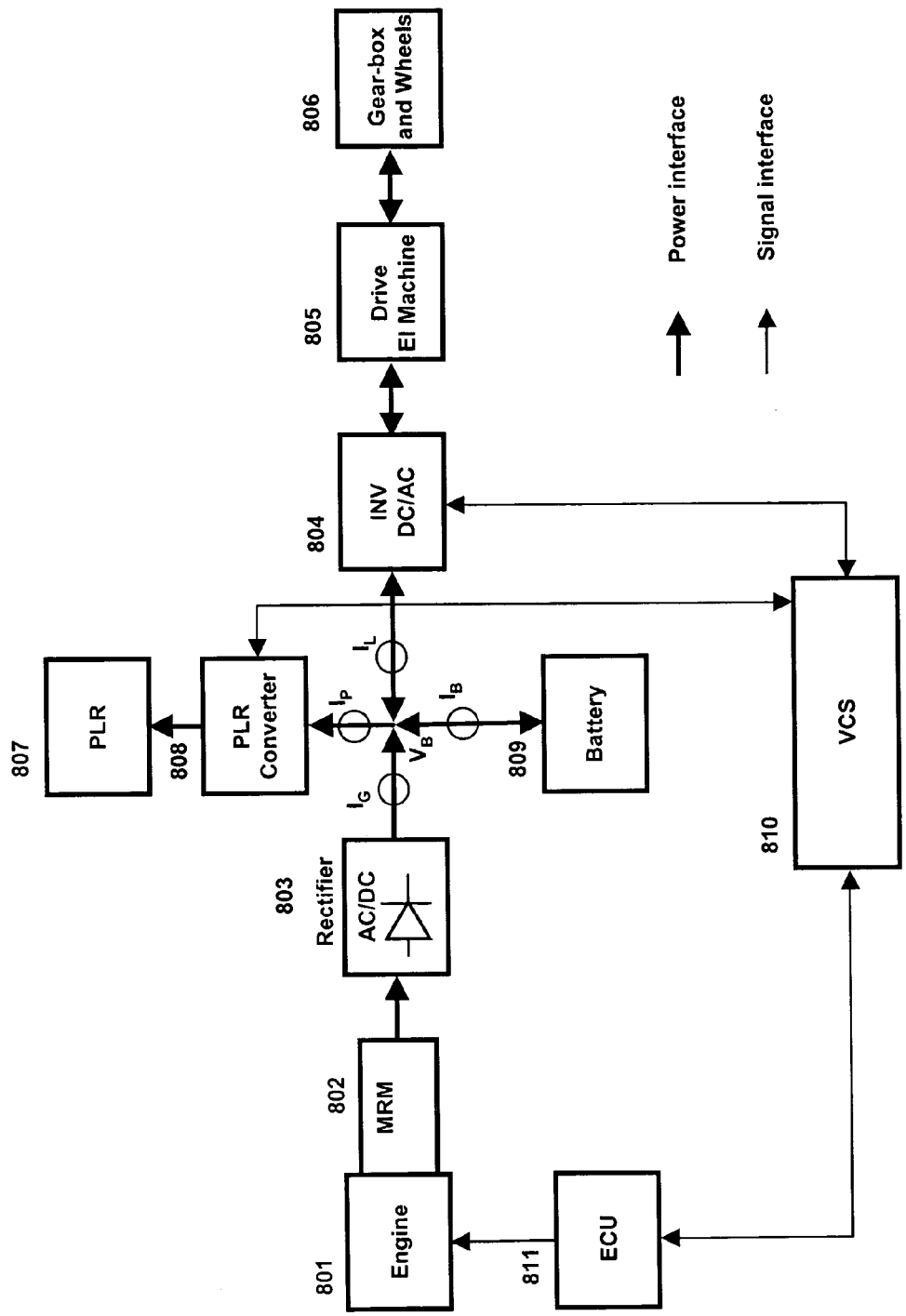
FIG. 8 is a block diagram of a novel hybrid vehicle architecture in accordance with an embodiment of the invention.

FIG. 8 provides a top-level block diagram of a novel hybrid vehicle architecture where the HEV includes a prime mover 801, and matched reaction machine (MRM) 802, a power conditioning unit 803, a converter unit 804, an electric machine unit 805, a mechanical energy transference unit 806, a parasitic load resistor 807, a parasitic load resistor power controller 808, a battery 809, a vehicle control unit 810, and an engine control unit 811. In the HEV of FIG. 8, the power conditioning unit 803, the parasitic load resistor power controller 808, the converter unit 804, and the battery 809 are all coupled to a common DC bus as shown by the arrows showing currents $I_G$, $I_L$, $I_B$, and $I_P$ flowing to/from the bus.

The prime mover 801 is preferably a turbine engine, but may be any apparatus suitable for use as a prime mover in the MRMPGS described above. The engine speed varies with the power demand to improve fuel efficiency. When the engine doesn't need to deliver any power (i.e. during a "no load" condition), the speed is maintained at a minimum value, possibly 32 krpm. At maximum power, the engine speed is adjusted to a maximum value, possibly 48.8 krpm.

The MRM 802, described above in relation to the MRM-PGS, is shown integrated with the turbine engine. There are at least two possibilities for this integration. The first is a direct shaft integration without a gearbox that allows for a gearless/oilless system with foil bearings or magnetic bearings. More conventional integration is possible where a gearbox is used for speed reduction, and where conventional bearings with an oil lubrication system are incorporated.

The power conditioning unit (PCU) 803 is an AC/DC power conditioning unit. Although alternative embodiments may include other forms of power conditioning units, the PCU 803 is generally a simple three-phase bridge rectifier. For example, the PCU 803 may be a 300-kw three-phase six-pulse rectifier. The function of the PCU 803 is to convert the three-phase power coming out of the machine 802 to DC power. The PCU 803 is directly connected to the battery bus in order to use the capacitance of the battery 809 for filtering DC power it provides. As a result, filtering hardware in the power electronics unit (PEU) is eliminated or substantially reduced.

In the simple three-phase rectifier of the PCU 803, fast diodes (not shown) are selected which have a low voltage drop, and in most embodiments at least one filtering capacitor for reducing voltage ripple is used. The value of this capacitor will generally be minimized since the majority of the smoothing effect will be accomplished by the vehicle battery. This arrangement of the power conditioning unit presents minimal losses. Consequently, reduced volume and weight is achieved.

The three-phase rectifier/PCU 803 preferably interfaces with the machine 802 terminals via protection fuses (not shown). Fuses may be selected instead of a circuit breaker or a contactor for reduced cost, reduced volume, and increased reliability. The fuses protect the machine and the engine from destruction in case of short circuit in the electronics and in the interface feeder between machine and power conditioner. In alternative embodiments, the fuses may be replaced with other protection mechanisms, or an embodiment may not include any such protection mechanism.

The converter unit 804 includes the AC/DC converters of the propulsion drives. These converters are bi-directional. In one direction, the DC power from the engine/MRM and the battery is converted to AC power for electric machine motoring. In the other direction, the same drives are used to condition the regenerated power from the propulsion machines back to the DC distribution bus.

The electric machine unit 805 includes the electric machines of the propulsion drives. These electric machines act as drive motors or generators when the vehicle is in dynamic braking mode. Although PM machines are preferred, use of non-PM machines is also contemplated.

The mechanical energy transference unit 806 includes the wheels and the gearboxes that interface with the electric machine shafts and convert the rotation of the shafts into movement of the vehicle. In different embodiments, the unit 806 may comprise treads, wheels, axles, and/or fan blades, or some other apparatus suitable for moving the vehicle.

The parasitic load resistor (PLR) 807 is used to dissipate excessive power generated during dynamic braking if the battery is fully charged. Also, this device can be used for transient voltage adjustment of the DC distribution bus. The parasitic load resistor power controller 808 is a power-conditioning unit that controls power flow to the PLR. This power conditioner is unidirectional. The realization of this element is a simple buck converter.

The battery 809 is the vehicle battery. Although any reasonable form of energy storage may be used in place of the battery 809, if a battery is used, a battery with a smaller voltage variation as a function of load, temperature or other variables is preferred to attain a smaller distribution bus variation. It is contemplated that the battery 809 may also be replaced with a plurality of batteries or other energy storage devices coupled together.

The vehicle control unit 810 provides top-level coordination for power flow and other control and protection functions, which are not the subject of this description. Engine control unit 811 translates engine power demand to the specified engine speed.

It is contemplated that a direct drive generator configuration (i.e. the engine and generator having common or linked shafts) would be advantageous in regard to size, weight and cost. Such a configuration helps minimize the need for gears and bearings, provides for a very small gearbox casting, and simplifies the lube system considerably.

It is also contemplated that heat from energy dissipated in the PLR can be recovered by an engine recuperator and used in relation to the engine.

A possible option is a twin-pack concept (two separate turbogenerators, one recuperated and one not recuperated). This approach envisions gearless, oilless, direct-drive permanent magnet starter/generators (PMS/G) at higher speed. The idea is to obtain a much smaller package and a simpler engine (no lube system, no gearbox). The MRMPGS hybrid topology offers an optimized solution for this integration.

MRM HEV Operation-DC Bus Current Flow

Nine operating states of the HEV of FIG. 8 are of particular interest, and will be described in regard to current flowing into and out of the DC bus of the HEV. The first seven states occur during normal vehicle operation. The last two states are used for diagnostics. Table 1 summarizes the current balance in the system for the nine different operating states. Since the distribution system/DC bus is directly coupled with the battery, the DC bus voltage follows the battery voltage. As described above, the DC bus is a common node of the four major generating and loading elements. For some elements, the currents are bi-directional at different states, for others they are unidirectional. Any one of the currents can be zero at some states. The positive sign is reserved for generating, i.e. current flowing into and through the DC bus. The negative sign is adopted for load currents. A brief description of these currents follow.

$I_G$ is the generator current that comes from the rectified MRM AC power of the MRM 802 via the power conditioning unit 803. The sign of this current ($I_G$) is always positive since the engine does not provide motoring capability for the vehicle dynamic braking.

$I_L$ is the load current flowing to/from the propulsion load, i.e. the converter unit 804 and the electric machine 805. When the vehicle is in motoring mode, the sign of the current $I_L$ is negative. At dynamic braking, the sign of the current $I_L$ changes and back generation to the DC bus is provided.

$I_B$ is the battery current. It is bi-directional at different modes. During battery charge, the sign is negative. During power discharge, the sign is positive.

$I_P$ is the PLR current. This current is only negative since the PLR consumes. It does not generate power.

TABLE 2

| State # | CURRENTS | + $I_G$ | -/+ $I_L$ | +/- $I_B$ | - $I_P$ |
|---|---|---|---|---|---|
| 1 | $I_B = I_L$ | 0 | − | + | 0 |
| 2 | $I_G = I_L$ | + | − | 0 | 0 |
| 3 | $I_G = I_L + I_B$ | + | − | − | 0 |
| 4 | $I_G + I_B = I_L$ | + | − | + | 0 |
| 5 | $I_L = I_B$ | 0 | + | − | 0 |
| 6 | $I_L = I_P$ | 0 | + | 0 | − |
| 7 | $I_G = I_B$ | + | 0 | − | 0 |
| 8 | $I_G = I_P$ | + | 0 | 0 | − |
| 9 | $I_B = I_P$ | 0 | 0 | + | − |

State 1 is the "Engine Down" state. In State 1 the battery is the sole source of power to the load. In this state, the voltage $V_{gen}$ at the terminals of the MRM 802 are less than the battery voltage $V_{bat}$, and $I_B=I_L$. This condition is achieved when the engine is not running (silent watch) or the engine speed is so low that the voltage on the MRM 802 side of the power conditioning unit 803 is below the voltage on the DC bus side of the power conditioning unit 803.

State 2 is the "Battery Fully Charged" state. In State 2, the battery 809 is fully charged and the generator (MRM 802) has the capacity to supply full load demand in the form of $I_L$. In this state, $V_{gen}=V_{bat}$, $I_G=I_L$, and the generator (MRM 802) maintains a constant voltage across the propulsion load and provides all the power to the load.

State 3 is the "Battery Not Fully Charged" state. In State 3, the battery 809 is not fully charged, but the generator (MRM 802) has the capacity to supply full load demand as well as current for charging the battery 809. In this state, $I_G=I_L+I_B$.

State 4 is the "Peak Power Condition" state. In state 4, the power demand exceeds, at least for the moment, the engine/generator capability. In this state, the load is supplied simultaneously by the generator (MRM 802) and the battery 809, and $I_G+I_B=I_L$.

State 5 is the "Load Regeneration to Battery" state. In State 5 the vehicle is in a dynamic braking mode, the battery 809 is not fully charged, the generator (MRM 802) voltage is below the battery 809 voltage, and the generator (MRM 802) should not deliver power. Preventing the generator (MRM 802) from delivering power/current allows for more energy absorption in the battery, and preventing delivery of power can be accomplished by reducing the electric machine back EMF below the voltage of the battery 809. During this state the entire regenerated power is stored in the battery 809, and $I_L=I_B$.

State 6 is the "Load Regeneration to PLR" state. In State 6, the vehicle is in a dynamic braking mode with the battery 809 fully charged. The generator (MRM 802) voltage is below the battery 809 voltage and does not deliver power, and substantially all of the regenerated power is dissipated in the PLR 807. In this state $I_L=I_B$.

State 7 is the "Battery Charge Only" state. In State 7, the vehicle is not in an active operating mode, the battery 809 is not fully charged, but the generator (MRM 802) is generating power. In this state the generator charges the battery and does not deliver power to the propulsion load, and $I_G=I_B$.

State 8 is the "Generation to PLR Only" state. In State 8, the vehicle is not in an active operating mode, the battery is fully charged, and the generator is generating power. In this state the generator delivers power to the PLR only, and $I_G=I_P$. This mode can be used for diagnostics purposes.

State 9 is the "Battery Discharge to PLR Only" state. In State 9, the vehicle is not in an active operating mode, and the generator (MRM 802) is not generating power. In this state, the battery 809 delivers power to the PLR only, and $I_B=I_P$. This mode can be used for diagnostics purposes.

During operation, the vehicle will undergo fast load changes. The fast load changes are compensated by the machine voltage drop and the battery current balance. The slow load changes are compensated by engine speed trimming.

MRM HEV Operation-Mechanical Time Constant Control Topology

Figure 9:
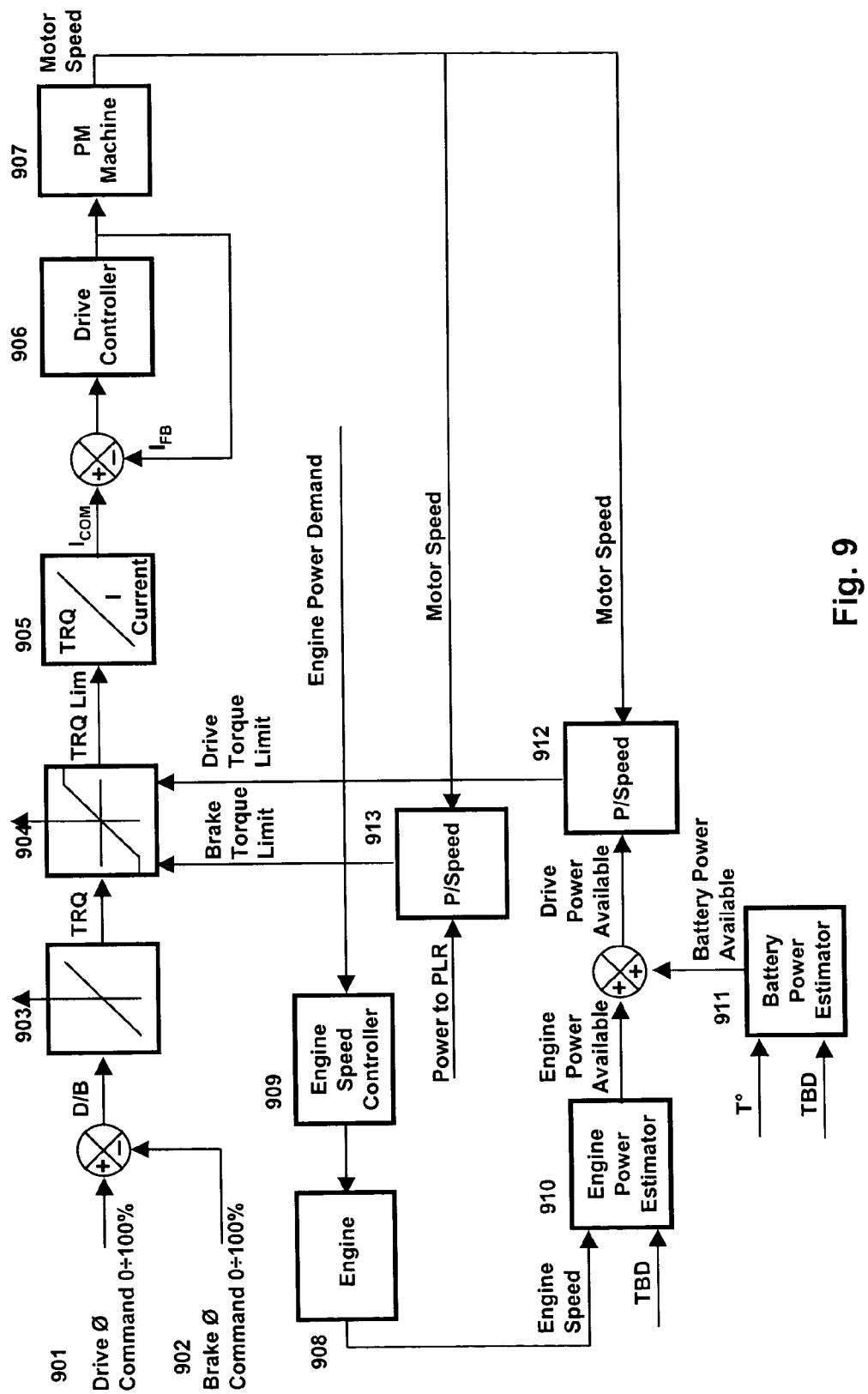
FIG. 9 is a block diagram of a control architecture of a hybrid topology on a mechanical time constant level in accordance with an embodiment of the invention.

FIG. 9 represents the top-level control architecture of the proposed hybrid topology of the HEV of FIG. 8 on a mechanical time constant level. As illustrated, momentary system power availability is accurately estimated based on various conditions, and is then translated to proper torque limits based on the momentary motor/vehicle speed. As a result, coordination between power consumption and generation is achieved at any moment without violating power and energy balance. As a result, the architecture shown achieves the following, at least in part: (a) providing a balanced power flow in the hybrid architecture without violating operating states requirements; (b) providing a balanced power flow in the hybrid architecture without violating transition from state to state requirements; (c) preventing battery power/current overload in order to extend battery life; (d) preventing turbine engine power overload in order to prevent engine stall; (e) preventing turbine engine power overload in order to eliminate engine overheating and extend engine life; (f) preventing turbine PLR power overload in order to eliminate overheating and extend PLR life; and (g) providing proper power/speed control of the engine to maximize fuel efficiency. In regard to (g), the engine will operate at a predetermined speed at any power level. The engine power demand is input to this control topology from the electric time constant control topology.

As FIG. 9 illustrates, inputs include a drive command 901 and a brake command 902. The drive command 901 and the brake command 902 each vary between 0 and 100% and are combined with different signs in order to obtain a Drive/Brake command D/B. The result from these two commands is interlocked to prevent miss-operation of the vehicle.

Once formed, the D/B command is converted to a torque value/signal TRQ in a conversion unit 903 which can be either positive or negative. When it is positive, an accelerating torque is required. When it is negative, a braking torque is required. After initial formation of the torque value/signal, the value/signal is adjusted in a torque limiting device 904. The purpose of such a device is to limit the torque applied to the propulsion system based on the power available from the engine and from the battery combined. Also, this device limits the break torque that can be applied based on the propulsion motor speed and power allowed to be dissipated in the PLR 807. The adjusted value/signal (TRQ Lim) is then transmitted to a converter 905 which converts the torque value/signal to a current $I_{COM}$ which is combined with a feedback current $I_{FB}$ and fed into a drive controller 906. The drive controller 906 converts the DC power of the distribution bus to AC power applied to the electric machine 907 (805 in FIG. 8) to create magnetomotive force.

The engine power input is another input shown being transmitted to a speed controller 909 used to control a turbine engine 908 (801 in FIG. 8). The speed controller 909 converts the required propulsion power to turbine speed. A lookup table can be used for this conversion. The engine 908 is operated with variable speed for fuel efficiency with less fuel being used when less power is needed from the MRM 802 of FIG. 8. In order to operate the engine 908 efficiently, a number of estimators are used. An engine power estimator 910 evaluates the maximum power available from the engine based on the engine speed and other conditions. A battery power estimator 911 calculates the maximum power available from the battery based on temperature and other conditions. The estimates from the estimators 910 and 911 are combined and used by a calculator 912 to calculate the torque available for the propulsion drive. This torque is used as a drive torque limit in torque limiting device 904.

In addition to the drive torque limit, the torque limiting device 904 receives a brake torque limit from a calculator 913 that calculates the torque allowed for dissipation based on the momentary speed of the machine 907 and the power capability of the PLR. The power capability of PLR is dependent on temperature and other conditions.

MRM HEV Operation-Electrical Time Constant Control Topology

Figure 10:
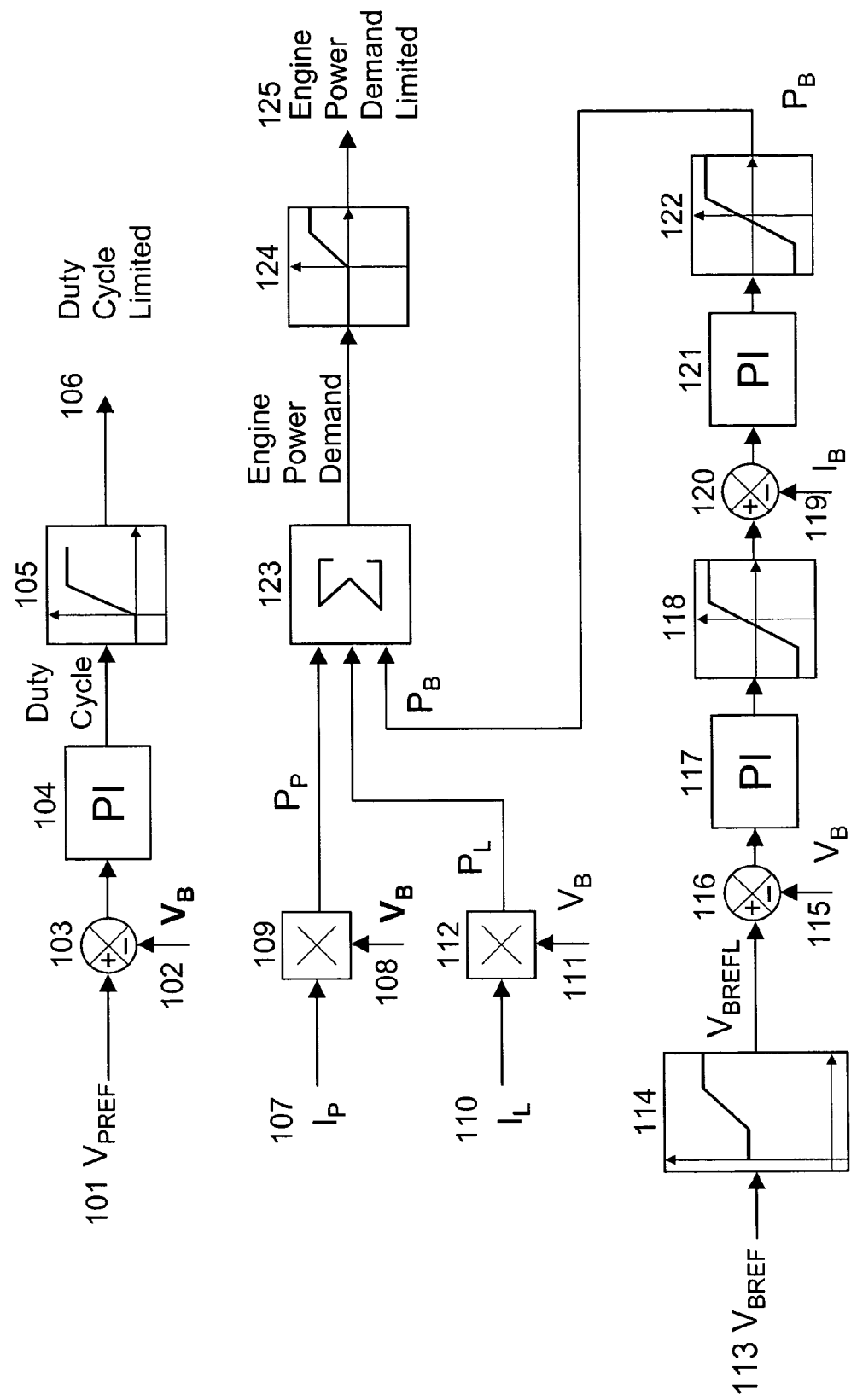
FIG. 10 is a block diagram of a control architecture of a hybrid topology on an electrical time constant level in accordance with an embodiment of the invention.

FIG. 10 represents the top-level control architecture of the proposed hybrid topology of the HEV of FIG. 8 on an electrical time constant level. The architecture shown achieves the following, at least in part: (a) providing a balanced power flow in the hybrid architecture without violating operating states requirements; (b) providing a balanced power flow in the hybrid architecture without violating transition from state to state requirements; (c) preventing battery power/current overload to extend battery life; (d) preventing turbine engine power overload to prevent engine stall; (e) preventing turbine engine power overload to eliminate engine overheating and extend engine life; (f) preventing turbine PLR power overload to eliminate overheating and extend PLR life; (g) providing proper engine power demand signal to the mechanical control architecture; (h) maintaining the battery level of charge as close as possible to a pre-determined desired level; (i) providing the capability to adjust the level of charge at any point from fully charged to fully discharged level; (j) allowing bidirectional operation of the propulsion drives; (k) storing regenerated power obtained during dynamic braking in the vehicle battery; and (l) if the vehicle battery is fully charged during dynamic braking, dissipating the regenerated power in the PLR.

Based on the top-level hybrid architecture shown in FIG. 8 and states definition included in Table 1, the following equation (8) for the current balance at the battery terminals can be extracted:

$$I_G=I_B+I_L+I_P \qquad (8)$$

The generator current $I_G$ is positive since there is no provision for engine dynamic braking. The sign of the PLR current $I_P$ is negative since this device is a consumer. The other two currents, $I_B$ (battery), and $I_L$ (load), are bidirectional and their signs change at different operating states. The battery current is positive when power is delivered to the bus and negative when battery is charging. The load current is negative when the propulsion machines apply accelerating torque to the wheels. The load current is positive when the vehicle dynamic braking is required and the motors act as generators. In this condition, power is regenerated to the distribution bus.

$V_B$ is the momentary value of the battery voltage. The power values of the generator, battery, propulsion load, and PLR have the same signs as the current values, and the relationship between them can be determined by multiplying both sides of equation 8 by $V_B$. The result is the following equation (9) for the power balance in the system:

$$P_G = P_B + P_L + P_P \tag{9}$$

It should be noted that the HEV illustrated in FIG. 8 includes only two actively controlled elements, engine speed and power dissipation in the PLR. At the same time several major objectives have to be met in order to achieve optimized system operation. This condition imposes certain challenges to the control system implementation.

Equation 9 can be rewritten to include the control elements as illustrated in the following equation (10):

$$P_G = V_B^*(V_{Bref} - V_B)^* K_{IB} + I_L^* V_B + V_B^*(V_{Pref} - V_B)^* K_{IP} \tag{10}$$

$V_{Bref}$ is the battery reference voltage. This is the target voltage of the vehicle battery. The difference in the first set of brackets defines an error number that drives the system to create more charging or more discharging battery current. If the difference is positive, the battery voltage is below the reference (desired) value and a battery charging current will be requested. If the difference is negative, the battery voltage is above the reference (desired) value and a battery discharging current will be requested. A typical number for battery reference voltage is 600.

$V_{Pref}$ is PLR reference voltage. This is the maximum allowable voltage in the system. Above this voltage, the PLR converter is activated and power dissipation to the PLR is initiated. The difference in the second pair of brackets defines an error number that drives the system to control the duty cycle of the PLR converter. If the difference is positive, there is no action because the voltage is within the operating range. If the difference is negative, the operating voltage exceeds the maximum allowable voltage and more power is dissipated in the PLR. A typical number for PLR reference voltage is approximately 624 V.

$K_{IB}$ and $K_{IP}$ are regulator functions for battery control and PLR control.

Equation 11 should be satisfied to prevent excessive losses in the PLR.

$$V_{Bref} \leq V_{Pref} \tag{11}$$

FIG. 10 represents the top-level control architecture of the proposed hybrid topology on the electrical time constant level. In FIG. 10, elements 101 through 106 represent the PLR "buck" converter control topology. It is independent of the remaining part of the control topology. A constant chopping frequency modulation scheme is selected. Voltage 101 is the PLR reference voltage $V_{Pref}$ described above. Voltage 102 is the measured battery voltage $V_B$ described before. Element 103 calculates the difference between both voltages (101 and 102) to form an error signal output. That error signal is fed to a proportional integral (PI) regulator 104 that generates the required duty cycle. The generated duty cycle is fed to duty cycle limiter 105 that prevents action to the PLR converter when the bus voltage is below the maximum allowable, and limits the duty cycle to 100%. The output 106 goes to the modulation circuitry for the chopper control signal formation.

It is contemplated that other control arrangements for PLR control with similar results can also be implemented. One possible option is a bang-bang regulator instead of a constant frequency modulation.

A limited engine power demand signal/value 125 is generated using: current 107, the measured PLR current, the measured battery voltage (108, 111 and 105 which are the same voltage as voltage 102); measured load current 110; the battery reference voltage 113, i.e. the desired battery voltage; and the measured battery current 119.

As shown, a multiplier 109 multiplies the voltage 108 and the current 109 in order to calculate the dissipated power $P_P$ in the PLR. A multiplier 112 multiplies the voltage 111 and current 110 in order to calculate the load power $P_L$. $P_L$ can be a positive or negative number depending on whether the propulsion machines are in generating or motoring mode. $P_L$ and $P_P$ are summed with the battery power $P_B$ in a summing unit 123 to obtain the needed engine power demand. The output of the engine power demand is limited between 0 and the maximum engine power in a limiter 124 to obtain the limited engine power demand signal/value 125. The limited engine power signal/value is the engine power demand input of FIG. 9.

The battery power $P_B$ is obtained from the voltages 113 and 115, and the current 119. As shown, the voltage 113 is limited in reference voltage limiter 114 to prevent the reference voltage from going beyond an acceptable value, possible to prevent overcharge or undercharge of the battery. The output of limiter 114 is fed to block 116 along with voltage 115 to calculate the difference between both voltages in order to form the error signal. The error signal is then passed to a PI (proportional integral) regulator 117 that generates a value/signal for the battery current. This value signal is limited in current limiter 118 to prevent the battery charge current or the battery discharge current from exceeding the maximum allowed values. The output of limiter 118 is compared with the measured battery calculator 119 in to from a current error value/signal. The current error value/signal is then passed to a PI regulator 121 to generate a battery power value/signal which is limited by power limiter 122 to prevent the battery charge power and/or the battery discharge power from exceeding maximum allowed values. The output of limiter 122 is the PB value/signal which is summed with $P_L$ and $P_P$ as previously described to obtain the needed engine power demand.

An HEV as described herein in regard to FIGS. 8, 9, and 10 provides numerous advantages such as: (a) simplifying power generation hardware in that only a simple six-pulse rectifier is used for AC/DC power conversion; (b) providing for battery recharging without costly power converter hardware is achieved; (c) accomplishing continuous vehicle dynamic braking by operating the propulsion motors as generators and conditioning the regenerated power back to the DC distribution bus for storage in a battery and/or dissipation in a PLR; (d) DC bus voltage variation matches the battery voltage variation, which primarily depends on temperature and the level of battery charge; (e) the inherently high-capacitance of the battery is used for filtering purposes reducing the need for other forms of filtering hardware for power generator conditioning; (f) the DC bus voltage remains independent of the generator speed variation; (g) the MRM operates at a power factor close to unity for the entire speed/power range with the result that minimized losses are expected both in the machine and the semiconductor rectifier; (h) permitting generator current (power) to be regulated from zero to a maximum value by trimming the engine speed; (i) increasing reliability at least in part by using a simplified power topology with a reduced number of electronic components; and (j) facilitates variable speed prime mover operation for fuel efficiency and constant output DC voltage.

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described.

What is claimed is:

1. A hybrid-electric vehicle (HEV) comprising:
a prime mover;
a matched reactance machine integrated with the prime mover;
a power conditioning unit receiving three-phase power from the matched reactance machine, wherein the power conditioning unit is a three-phase bridge rectifier using six diodes without using semiconductor switches; and
a control unit for controlling a speed of the matched reactance machine to provide a substantially constant terminal voltage for a variable demand level; wherein:
the matched reactance machine comprises a permanent magnet rotor type machine having a back electromotive force (BEMF) voltage with a line-to-line peak voltage that is equal to a desired terminal voltage of the matched reactance machine at a first finite machine speed; and
the matched reactance machine having an inductance value which allows for a proportional increase in the selected BEMF voltage value throughout a speed range between the first machine speed and a second machine speed which second machine speed is greater than the first speed.

2. The HEV of claim 1 wherein the machine comprises a three phase permanent magnet (PM) generator.

3. The HEV of claim 2 wherein each phase of the PM generator is coupled to a simple bridge rectifier, and the bridge rectifier is coupled to a common DC bus.

4. The HEV of claim 3 wherein the HEV comprises a power storage unit coupled to the DC bus in parallel with the bridge rectifier, and in parallel with a propulsion load.

5. The HEV of claim 4 wherein the power storage unit is a battery.

6. The HEV of claim 4 (I am not sure this is a correct reference) comprising a turbine engine coupled to the matched reactance machine.

7. The HEV of claim 1, wherein the machine has a BEMF voltage value at said first speed and a terminal voltage at said first speed with substantially equal amplitude and with an electrical phase difference of approximately zero.

8. The HEV of claim 1, wherein the first machine speed corresponds to a substantially zero delivered power.

9. The HEV of claim 1, wherein the second machine speed corresponds to a substantially maximum delivered power.

10. The HEV of claim 1, wherein a machine reactance value at the second speed is equivalent to a vector diagram calculation for reactance including a machine terminal voltage vector and an internal machine voltage drop vector.

11. The HEV of claim 10, wherein the machine terminal voltage vector and the internal machine voltage drop vector are perpendicular.

12. The HEV of claim 1, wherein the excitation of the machine is fixed and achieved by at least one permanent magnet embedded in a rotor assembly.

13. The HEV of claim 1, wherein:
the matched reactance machine comprises a three phase permanent magnet (PM) generator, each phase of the PM generator being coupled to a simple bridge rectifier, and the bridge rectifier is coupled to a common DC bus;
a battery coupled to the DC bus in parallel with the bridge rectifier, and in parallel with a propulsion load; and
a turbine engine coupled to the matched reactance machine.

14. The HEV of claim 13, wherein:
the BEMF voltage value of the machine at said first speed and the terminal voltage of the machine at said first speed have a substantially equal amplitude and an electrical phase difference of approximately zero;
the first machine speed corresponds to a substantially zero delivered power;
the second machine speed corresponds to a substantially maximum delivered power;
a machine reactance value of the machine at the second speed is equivalent to a vector diagram calculation for reactance including a machine terminal voltage vector and an internal machine voltage drop vector;
the machine terminal voltage vector and the internal machine voltage drop vector are perpendicular; and
the machine speed is controlled to provide a substantially constant terminal voltage for a variable power demand level.

15. The HEV of claim 1 further comprising:
a drive command;
a brake command;
a conversion unit adapted to produce a torque value signal which signal may be positive or negative;
a torque limiting device adapted to produce a torque limited signal;
a converter adapted to convert the torque limited signal to a current $I_{com}$ and further adapted to combine said $I_{com}$ with a feedback current and provide a resultant combined signal to a drive controller; and
the drive controller adapted to convert DC power of a distribution bus to AC power deliverable to an electric machine.

16. The HEV of claim 15 further comprising:
a speed controller adapted to control a turbine engine;
an engine power estimator;
a battery power estimator; and
a calculator adapted to combine estimates for the engine power estimator and the battery power estimator and provide a torque limit signal to the torque limiting device.

17. A method of providing power to a propulsion load of a hybrid-electric vehicle (HEV) comprising:
providing a turbine engine driven permanent magnet rotor type machine, a battery, a simple three phase rectifier and a propulsion load;
coupling the generator to the simple three phase rectifier, and coupling the combination of generator and rectifier in parallel with the battery and the propulsion load;
using the generator and battery to provide power to the propulsion load, and the battery to store power produced by the propulsion load;
wherein the permanent magnet rotor type machine has a selected back electromotive force (BEMF) voltage value and a selected machine inductance value, wherein an excitation of the machine is fixed and achieved by at least one permanent magnet embedded in a rotor assembly of the machine;
wherein the BEMF voltage value is selected at a first machine speed having a line-to-line peak voltage that is equal to a desired terminal voltage of the machine the BEMF value having substantially equal amplitude to the desired terminal voltage at the first speed and wherein an electrical phase difference between the BEMF value and the terminal voltage is approximately zero;

wherein the machine inductance value is selected based upon a machine reactance value at a frequency value which correspond to a proportional increase in the selected BEMF voltage value between the first machine speed and a second machine speed which second speed is greater that the first speed, wherein the terminal voltage and a phase current are in phase; and wherein an output voltage of the machine remains substantially constant throughout a speed range between the first speed and the second speed, a machine speed being selected based on a variable power demand level.

* * * * *